Patented Apr. 2, 1929.

1,707,248

UNITED STATES PATENT OFFICE.

JOSEPH BLUMENFELD, OF SERQUIGNY, FRANCE, ASSIGNOR TO COMMERCIAL PIGMENTS CORPORATION, OF NEW YORK, N. Y., A CORPORATION OF DELAWARE.

PROCESS FOR THE MANUFACTURE OF TITANIUM OXIDE.

No Drawing. Application filed June 8, 1926, Serial No. 114,573, and in France June 11, 1925.

The present invention has for its object a process for the manufacture of titanium oxide. The said process consists in a combination of operations assuring the recovery of the sulphuric acid which is employed for attacking the titanium ore in the preparation of titanium oxide by the hydrolytic method, and it further consists in the use of sub-normal temperatures for crystallizing the sulphate of iron accompanying the sulphuric solutions of titanium oxide which are employed in this manufacture.

It is a known fact that ilmenite is the ore which is most widely employed for the manufacture of titanium compounds, and this ore corresponds, as to its crude composition, to a titanate of iron. The simplest method for the treatment of this ore is to act upon it by sulphuric acid and to dissolve the products of the reaction in water. The resulting solution which after the optional reduction of the ferric salts has been cooled to the room temperature and which has lost by crystallization a part of the ferrous sulphate which is contained, will necessarily remain saturated with this salt, and will contain some 40 grams of iron per liter. This large proportion of a ferrous salt is a source of difficulty in the subsequent treatment, and is an insurmountable obstacle to the recovery of the sulphuric acid contained in the mother liquors of the hydrolysis.

In fact, if the hydrolysis of the titanium sulfate in such a saturated solution of iron sulphate is effected without diluting it considerably, it is found that the separation of the titanium oxide and the concomitant disengagement of the sulphuric acid which was combined therewith will diminish the solubility of the ferrous sulphate. Whence as a result, the mother liquor of the hydrolysis, when brought to the initial temperature of the solution, will abandon crystals of iron sulphate, which become mixed with the hydrolyzed titanium oxide and render the washing of the latter practically impossible. No other resource can be found except to dilute the solution which is employed in the hydrolysis treatment, but this will render the recovery of the sulphuric acid more costly, and even quite expensive.

On the other hand, if it is desired to recover the sulphuric acid disengaged by the hydrolysis, for instance by the concentration of the mother liquor, in order to employ it for a subsequent action upon the ore, it will be again found that the presence of a certain amount of sulphate of iron corresponding to the solubility of this salt at the room temperature in the original solution of the titanium salt, will constitute an insurmountable obstacle to this recovery, due to the crystallization of the iron salts and to the thickening of the acid caused by such salts.

However the aforesaid disadvantages can be eliminated if the percentage of iron in the solution of the titanium salt is reduced by subjecting this latter to the action of a sub-normal temperature, that is about +5°, 0° or —5° C., or below. Under these conditions it has been shown by experiment that the sulphate of iron will crystallize without forming a double salt with the tetravalent titanium salts, if present in the solution in the proportion of 25, 20 or 15 grams per liter, or less respectively.

The removal of the crystals which are formed being effected at this temperature, for instance by decantation or by means of a centrifugal separator, a vacuum filter, or the like, the solution may be hydrolized, without depositing sulphate of iron by a subsequent cooling to the room temperature, and without any necessity of diluting it to avoid crystallization in the mother liquor. Finally, the mother liquor which is freed from the precipitate by filtration, may be readily concentrated without being thickened by reason of the crystallization, and the sulphuric acid thus recovered may be employed for acting upon a fresh quantity of ore.

What I claim is:

1. A process for producing titanium dioxide which comprises acting on a material containing titanium and iron with sulfuric acid, dissolving said reaction product in water, cooling the solution to about +5° C. or less, separating out the iron sulfate crystals formed at said low temperature, hydrolyzing said solution, separating the resultant titanium dioxide, and concentrating the mother liquor to recover the sulfuric acid in usable form for the process.

2. A process for producing titanium dioxide which comprises acting on a material containing titanium and iron with sulfuric acid, dissolving said reaction product in water, cooling the solution to about +5° C.

or less, separating out the iron sulfate crystals formed at said low temperature, and hydrolyzing said purified solution.

3. In a process for the manufacture of titanium dioxide by hydrolysis, the step which comprises cooling an aqueous solution containing titanium, ferrous iron, and sulfuric acid to about +5° C. or less, and separating out the ferrous sulfate crystals formed at said low temperature.

4. A process for the removal of ferrous sulfate from a solution containing titanium, ferrous iron, and sulfuric acid, which comprises cooling said solution to about +5° C. or less, and separating out the ferrous sulfate crystals formed at said low temperature.

In testimony whereof I have signed my name to this specification.

JOSEPH BLUMENFELD.